United States Patent
Butter et al.

(10) Patent No.: US 7,984,204 B2
(45) Date of Patent: Jul. 19, 2011

(54) PROGRAMMABLE DIRECT MEMORY ACCESS CONTROLLER HAVING PIPELINED AND SEQUENTIALLY CONNECTED STAGES

(75) Inventors: Adrian S. Butter, Binghamton, NY (US); Liang Chen, Shanghai (CN); Liang Ge, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 12/119,924

(22) Filed: May 13, 2008

(65) Prior Publication Data
US 2009/0287860 A1    Nov. 19, 2009

(51) Int. Cl.
*G06F 13/28* (2006.01)
(52) U.S. Cl. .......................................... 710/23; 710/22
(58) Field of Classification Search ................ 710/23
See application file for complete search history.

(56) References Cited

U.S. PATENT DOCUMENTS

| | | | |
|---|---|---|---|
| 5,182,800 A | 1/1993 | Farrell et al. | |
| 6,198,477 B1 * | 3/2001 | Kurtze et al. | 715/201 |
| 2002/0013867 A1 * | 1/2002 | Matsuki et al. | 710/22 |
| 2002/0154081 A1 * | 10/2002 | Niimura et al. | 345/87 |
| 2003/0223007 A1 * | 12/2003 | Takane | 348/335 |
| 2007/0188513 A1 * | 8/2007 | Li | 345/603 |
| 2008/0089671 A1 * | 4/2008 | Lang et al. | 386/109 |

* cited by examiner

*Primary Examiner* — Chun-Kuan Lee
*Assistant Examiner* — Brooke J Dews
(74) *Attorney, Agent, or Firm* — Toler Law Group

(57) ABSTRACT

A Direct Memory Access controller controls access to memory in a data processing system via a system bus. The controller is made up of a data load unit configured for performing load operations with data. A data computation unit is configured for performing data conversion and is pipeline connected in sequence to the data load unit. A data store unit is also pipeline connected in sequence to the data computation unit and is configured for performing burst store operations onto a system bus for storage in system memory.

20 Claims, 2 Drawing Sheets

PROGRAMMABLE DIRECT MEMORY ACCESS CONTROLLER HAVING PIPELINED AND SEQUENTIALLY CONNECTED STAGES

FIELD OF THE INVENTION

The present invention relates generally to a Direct Memory Access (DMA) controller for controlling access to memory in a data processing system via a system bus, and more particularly, a programmable DMA controller that allows load and store operations and conversion of data being operated on by the controller.

BACKGROUND OF THE INVENTION

In typical embedded system applications, which are special-purpose computer systems designed to perform one or a few dedicated functions, Host Processor utilization is a very critical parameter in determining overall system performance. When the Host Processor spends cycles executing data movement instructions, overall system performance is greatly degraded. In order to relieve the Host Processor of this penalty and improve system performance, hardware-based DMA components were introduced.

A DMA controller is a feature of modern computers that allows certain hardware subsystems within the computer to access system memory for reading and/or writing, independent of the processor. Many hardware systems use DMA, including disk drive controllers, graphics cards, network cards, and sound cards. Computers that have DMA channels may transfer data to and from devices with much less processor overhead than computers without a DMA channel.

Without DMA, using programmed input/output ("PIO") mode, the processor is typically fully occupied for the entire duration of the read or write operation and is thus unavailable to perform other work. With DMA, the processor initiates the transfer, performs other operations while the transfer is in progress, and receives an interrupt from the DMA controller once the operation has been completed. This is especially useful in real-time computing applications where avoidance of stalling behind concurrent operations is critical.

The offload capability provided by traditional DMA components has helped Host Processors meet the system performance requirements of some applications. However, with the advent of more complex applications that require support for multiple data formats, such traditional DMA components fall short of offering sufficient offload capability. For example, when source video data in YUV format that is stored in on-chip memory, needs to be transferred to a display engine requiring such data to be in RGB format, the Host Processor must first read the data, execute instructions to do the format conversion, store the data back to on-chip memory, and finally initiate the DMA operation to transfer the data to the display engine. This flow is shown in the top half of FIG. 4. Because of the fixed functionality of the DMA component, efficiency of data movement is one-third the target.

One solution to address the above problem is adding data format conversion functionality to the external device. The primary drawback of this solution is an increase in total solution cost.

A second solution is to have the Host Processor run another instruction stream to do the data format conversion, and thereafter store the converted data to the on-chip memory. This will waste many Host Processor cycles, which in turn degrades overall system performance, especially for those compute-intensive data conversion operations like YUV/RGB conversion, Encrypt/Decrypt, etc.

A third solution that addresses the above drawbacks is to increase the flexibility of the DMA engine. Adding programmable capability to the current DMA component will offer the best tradeoff between cost and overall performance. However, typical execution of an instruction stream is sequential, which means such programmable capability will degrade bus utilization when data movement and data computation instructions are mixed together. When the computation engine inside such an enhanced DMA component is running, the data movement operation is idle. Since a typical burst operation will be divided into multiple sequential operations, degraded bus utilization will result.

Therefore, what is needed is a way to increase DMA component programmability and bus utilization compared to prior art fixed-function and general programmable DMA implementations, respectively.

SUMMARY OF THE INVENTION

The present invention provides an improved DMA controller and method of using such a controller that increases DMA programmability and bus utilization.

The present invention provides a DMA controller for controlling access to memory in the data processing system via a system bus. The DMA controller is segmented into three units. A data load unit is configured for performing load operations with data from a system bus. A data computation unit is configured for performing data conversion and is pipeline connected in sequence to the data load unit. A data store unit is configured for performing store operations with data by transferring converted data back to the system bus for storing in system memory. The data store unit is also pipeline connected in sequence to the data computation unit.

Embodiments may include a double buffering connection between the data load unit and the data computation unit, and between the data computation unit and the data store unit. The data load and data store units may be configured to perform load and store operations in burst mode.

According to an aspect of the invention, the data computation unit is configured for conducting data conversion from a first predetermined format of data to a second predetermined format of data. In exemplary embodiments, the formats are YUV to RGB or vice versa, or encrypted to decrypted or vice versa.

Aspects of the invention may include the data load unit and data store unit being programmable for controlling how much data is loaded or stored in a single burst.

Another aspect has each double buffering connection implemented as a dual port circular FIFO memory with user-selectable fullness threshold. Yet still further, the data computation unit may be programmable for running multiple software algorithms on data processed thereby.

Another aspect of the invention includes an improved method for controlling access to memory in a data processing system via a system bus. The aforedescribed DMA controller is provided. In accordance with the method, a predetermined amount of data from a system bus is loaded by the data load unit and transferred into first local memory of the DMA controller. The loaded data is fetched from the first local memory by the computation unit and operated thereon to transform the data into a different format than originally received. The transformed data is transferred into a second local memory of the DMA controller. The different format data is fetched from the second local memory by the data store unit and transferred into the system bus for storage in system memory.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

In one respect, the present invention increases DMA controller programmability compared to prior art fixed function and general programmable DMA implementations.

In an exemplary embodiment, the DMA controller is divided into three stages, i.e., data loading, data computation and data storing. The three stages are pipelined and connected sequentially with double buffering between them in order to make three separate stages running independent instruction streams for three different channels. Bus load and store operations are provided by the data loading and data storage stages, respectively. This eliminates the protocol overhead of transferring block data with multiple load instructions. In a system aspect, the typical burst transfer performance of the system bus to which the DMA controller is attached is not impacted.

Figure 1:
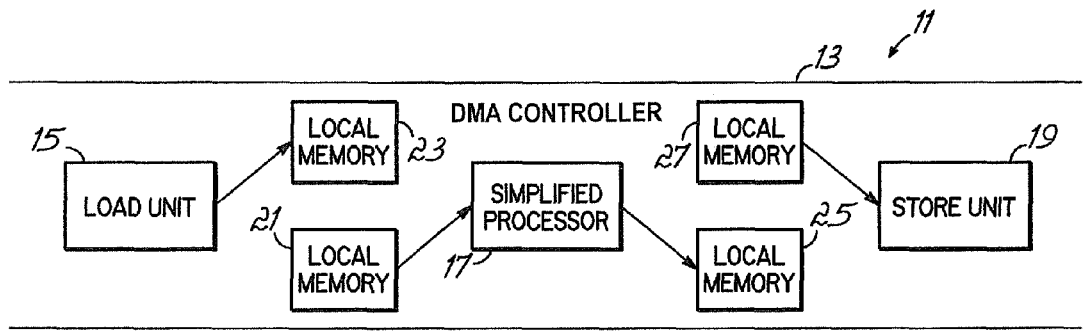
FIG. 1 is a block diagram showing a DMA controller design according to the invention.

The DMA controller 11, in accordance with the invention, is shown in block diagram in FIG. 1. A pipeline connection arrangement 13 provides for a load unit 15 connected through cycling first and second local memories 21 and 23, for example, buffer or cache, to a simplified processor 17 making up part of a computation unit. The simplified processor 17 is itself connected to third and fourth local memories 25 and 27 that are similar to the first and second local memories 21 and 23, to effect data transfer to the store unit 19.

In an exemplary embodiment, the local memory connections 21 and 23, and 25 and 27 are double buffering stages implemented as dual port circular FIFO memory with a user-selectable fullness threshold. This allows the user to customize the amount of data buffering between each preceding and following pipeline stage, providing as much flexibility as possible to optimize system bus utilization for a wide range of applications.

Figure 2:
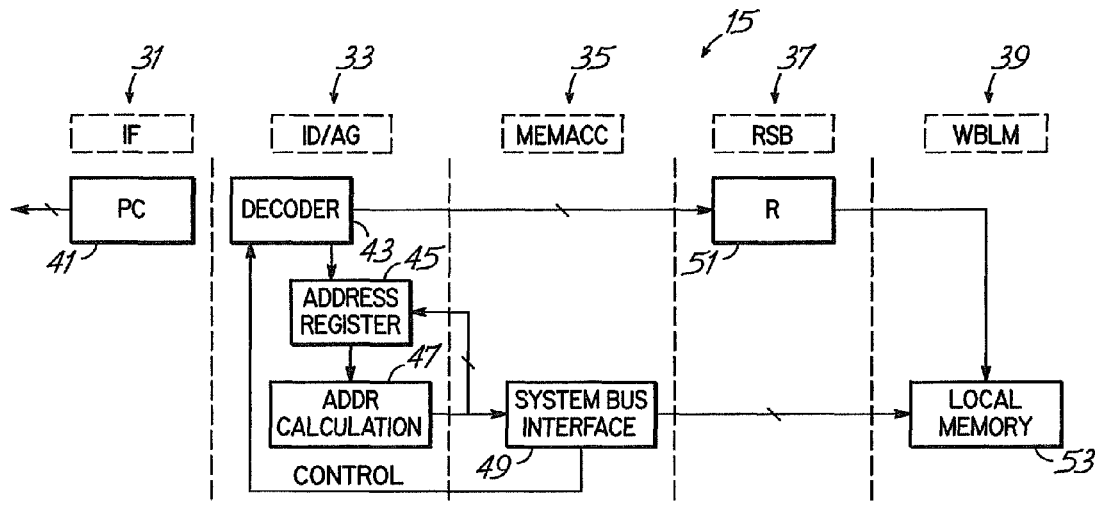
FIG. 2 is a detailed block diagram exemplary of a data load unit implemented in the DMA controller according to the invention.
Figure 3:
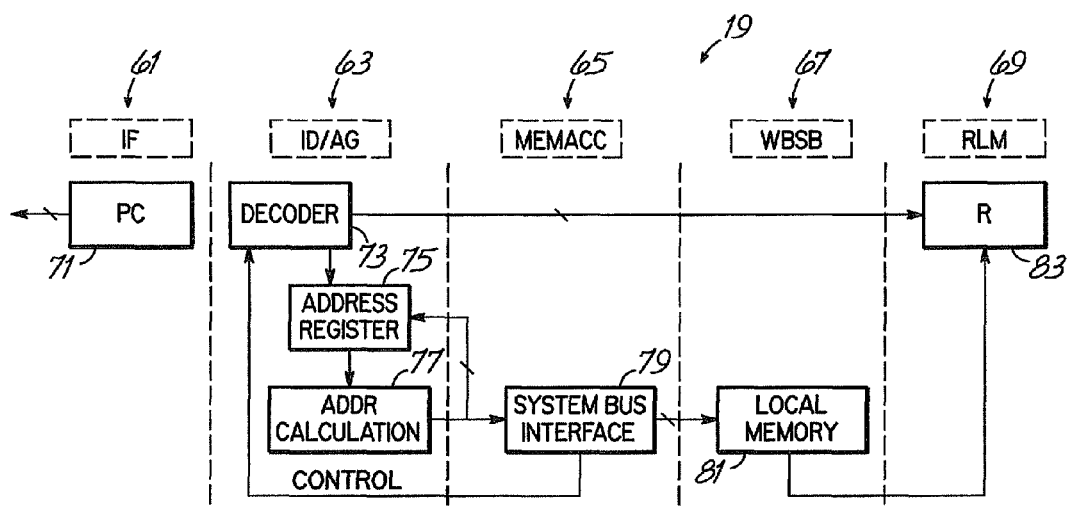
FIG. 3 is a detailed block diagram exemplary of a data store unit implemented in the DMA controller of the invention.

The load unit 15, as also illustrated in FIG. 2, may be implemented with two types of instructions. In accordance with the instructions, non-burst and burst load operations may be conducted. The burst load operation is configured in a manner known to those of ordinary skill in the art, and may provide support for up to the maximum burst size of the system bus to maximize bus load utilization and minimize bus protocol overhead.

In one embodiment, in a burst load operation, the data load unit 15 loads its address register 45 with a start address, and the burst length register is loaded with the transfer size. The load unit 15 is programmable and optionally programmed with instructions that allow it to issue a corresponding burst read request to the system bus. The data load unit 15 waits until the burst read transfer is initiated by the system bus. The load unit 15 stores the received data into its local memory 23, i.e., cache or buffer. As illustrated in FIG. 1, while local memory 23 is being loaded, the computation unit in the form of a simplified processor 17 may be unloading data from local memory 21 to perform operations on the data.

The load unit 15 implementing burst load operations behaves like prior art fixed-function DMA controllers without sacrificing performance.

The store unit 19 is similar to the load unit 15, and also primarily supports two types of instructions for non-burst and burst store operations. Thus, the store unit 19 will receive transformed data from the simplified processor 17, and a similar memory transfer operation is conducted through local memories 25 and 27 to that involved in transfer of data from load unit 15 through local memories 21 and 23 to the simplified processor 17. More particularly, the operation is more generally known as a ping pong buffer wherein one local memory 21 or 23, or 25 or 27, is being filled while the other local memory 21 or 23, or 25 or 27 is being emptied in a back and forth toggle operation.

In a further exemplary embodiment, the simplified processor 17 makes up the computation unit and is programmable with basic instruction sets, for example, for data conversion. Examples of data conversion involved include YUV/RGB conversion, encrypted/decrypted, etc. The DMA controller 11 optionally employs one unified instruction set architecture across a whole unit to achieve a simplified programming model. The simplified processor 17 may support multiple algorithms for different types of data conversion. A simplified processor 17 useful for implementation with the invention may be any RISC (like PPC or ARM) or CISC processor. In order to fit into a pipeline structure and achieve optimal bus utilization, the load unit 15, the store unit 19, and associated memories 21, 23, 25 and 27 are separated to allow concurrent access from the simplified processor 17.

FIG. 2 illustrates in greater detail the pipeline structure of the data load unit 15. More particularly, a pipeline inside the load unit 15 is divided into five stages, i.e., IF stage 31, ID/AG stage 33, MEMACC stage 35, RSB (System Bus Data Read) stage 37, and WBLM (Local Memory Write) stage 39. In IF stage 31, an instruction fetch operation is provided by program counter 41 that points to instructions in memory to grab the next set of data to be operated on. ID/AG stage 33 provides instruction decode and address generation through a decoder 43 that outputs a base address for system memory into an address register 45. The address is provided to an address calculator 47 that computes the system memory address from which system bus interface 49 accesses the current block of data, and updates address register 45 for the next storage address of data blocks in system memory.

Furthermore, address calculator 47 computes a corresponding local memory address which is input to system bus interface 49. Upon receipt of the system memory and local memory addresses, system bus interface 49 will request system bus access. Once granted system bus access, system bus interface 49 sends a synchronization message to decoder 43. It will be appreciated by those of ordinary skill in the art that if the system bus interface 49 contained in the MEMACC stage 35 encounters excessive delay, it may be further pipelined in order to reduce the protocol overhead of the load operation and thereby achieve a balanced pipeline.

Upon receipt of the synchronization message, decoder 43 supplies control information to read unit 51. This control information includes the amount of system memory data accessed per individual system bus read operation, as well as the total amount of system memory data in the current data block.

Once system memory data is available, read unit 51 will send this data to local memory 53, where it is written to the local memory address specified by system bus interface 49. Local memory 53 corresponds to local memories 21 and 23 of FIG. 1. As previously described, the simplified processor 17 may then fetch the data from the local memory 21 or 23 and then operate on the data.

The store unit 19 is similar to the load circuit unit 15 with some of the components rearranged. More specifically, an IF stage 61 is followed by an ID/AG stage 63, followed by a MEMACC stage 65. However, instead of having the RLM stage 69 follow, a WBSB (System Bus Data Write) stage 67 follows in sequence. The WBSB stage 67, in turn is followed by RLM (Local Memory Read) stage 69, at which the store unit 19 writes to the system bus.

IF stage 61 includes program counter 71. Program counter 71 may, for example, point to instructions in local memory 81. ID/AG stage 63 provides instruction decode and address generation through a decoder 73 that outputs a base address for system memory into an address register 75. The address is provided to an address calculator 77 that computes the system memory address at which system bus interface 79 will store the current block of data, and updates address register 75 for the next storage address of data blocks in system memory.

Furthermore, address calculator 77 computes a corresponding local memory read address which is input to system bus interface 79. Upon receipt of the system memory and local memory addresses, system bus interface 79 will output the local memory read address to local memory 81 and request system bus access. Local memory 81 corresponds to local memories 25 and 27 of FIG. 1.

One granted systems bus access, system bus interface 79 sends a synchronization message to decoder 73. It will be appreciated by those of ordinary skill in the art that if the system bus interface 79 contained in MEMACC stage 65 encounters excessive delay, it may be further pipelined in order to reduce protocol overhead of the load operation and thereby achieve a balance pipeline. Upon receipt of the synchronization message, decoder 73 supplies control information to the read unit 83. This control information includes the amount of system memory data accessed per individual system bus write operation, as well as the total amount of system memory data in the current data block. Once local memory data is available, read unit 83 will send this data to system memory, where it is written to the system memory address specified by system bus interface 79.

In order to support the new DMA controller 11 in accordance with aspects of the invention, system programmers simply need to add specific section notation to the Direct Memory Access portion of the instruction stream. A modified compiler will split the stream into three units and add synchronization between each of them. The three streams are processed by an assembler and separated with required constructs added. For example, if burst lengths are not supported by the hardware, they will be converted into multiple supported burst lengths and any required wait states may be added when the data length exceeds the internal buffer size. The three pieces of code are then loaded into the internal units, i.e., the load unit 15, simplified processor 17 and the store unit 19.

The following is an example of sample code for one embodiment of the invention as set forth below:

| LOAD_SEC: | Loadimm addrrega, localmemory_startaddr |
| --- | --- |
| | Memload (addrrega), [srcmeaddr] |
| EXEC_SEC: | Loadimm addrrega, localmemory_startaddr |
| | Loadimm addrregb, localmemory_targetaddr |
| | Load gprega, [addrrega] |
| | Aluop gprega |
| | Memload (addrregb), gprega |
| STORE_SEC: | Loadimm addrrega, localmemory_targetaddr |
| | Memstore (addrrega), [dstmamaddr] |

It will be readily apparent to those of ordinary skill in the art that alternative forms of the above code are possible.

Figure 4:
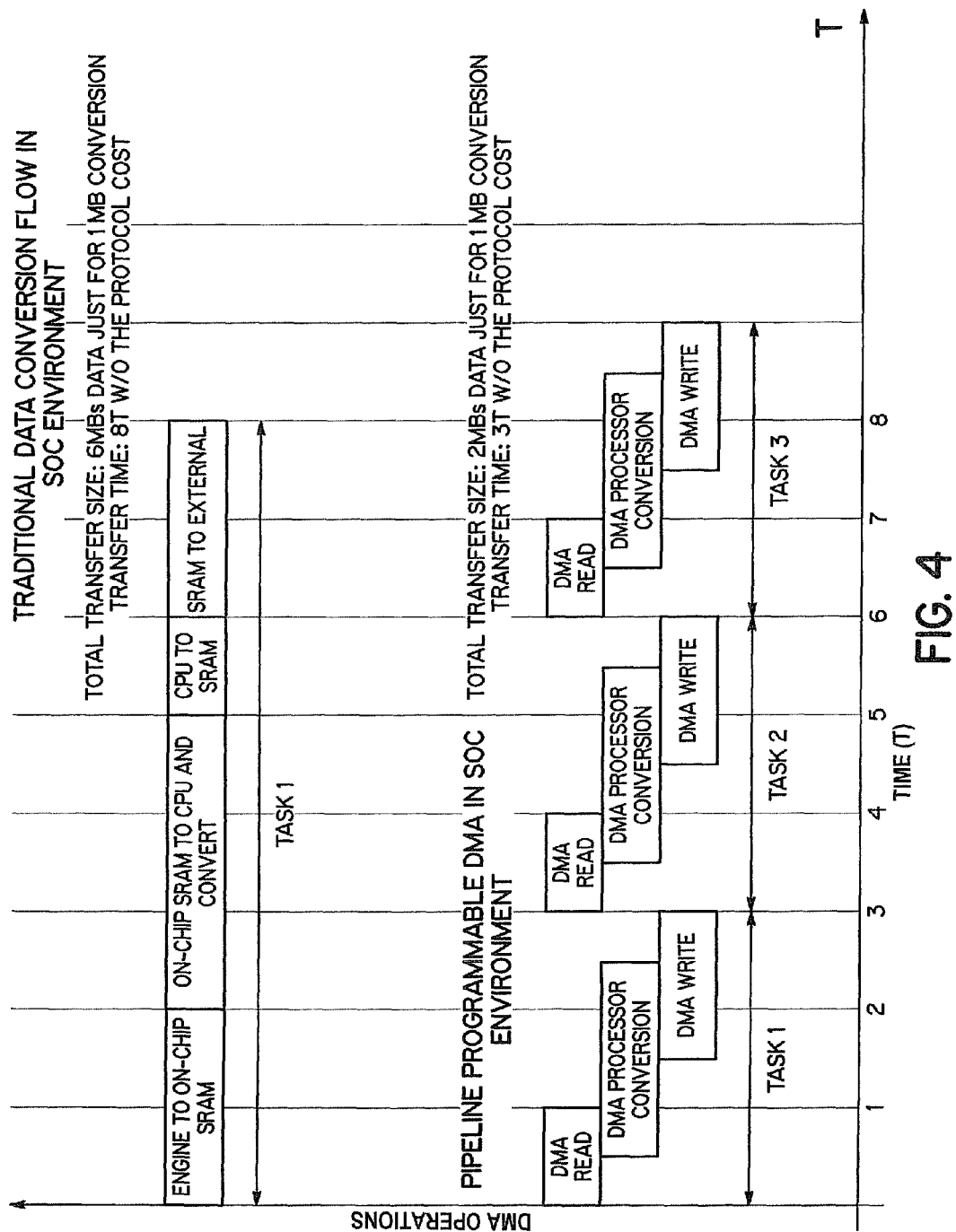
FIG. 4 is a graph illustrating traditional DMA operations employing data format conversion with a traditional DMA controller, and DMA operations as implemented in accordance with the device of the invention.

FIG. 4 illustrates in graph form the prior art typical DMA operation conducting data conversation, as compared to an operation implemented through the DMA control unit in accordance with embodiments of the invention.

As shown at the top of the graph, a task 1 with a conventional DMA controller provides that the DMA engine loads data to on-chip SRAM. In order to convert the data, that data must then be loaded into system CPU, converted by the system CPU, and then reloaded by the system CPU to on-chip SRAM. From there, the converted data is transferred to the system bus for storage in system memory or a peripheral device.

In a comparable time period as shown in FIG. 4, data conversion and storage in system memory may be conducted at a much faster rate since the system CPU is not involved. As shown therein for a task 1 as well as tasks 2 and 3, the DMA controller 11 reads the data with the load unit 15, converts the data with the simplified processor 17 and then writes the data with the store unit 19 to the system bus for eventual storage in system memory. Thus, three such operations may be conducted in the same amount of time as current configurations allow.

While the present invention has been illustrated by a description of various embodiments and while these embodiments have been described in considerable detail, it is not the intention of the Applicants to restrict or anyway limit the scope of the appended claims to such detail. The invention in its broader aspects is therefore not limited to the specific details, representative apparatus and method, an illustrative example shown and described. Accordingly, departures may be made from such details without departing from the spirit of scope of Applicants' general inventive concept.

What is claimed is:

1. A programmable multi-stage pipelined Direct Memory Access controller, comprising:
  a data load unit configured for performing a load operation;
  a data computation unit configured for performing a data conversion and the data computation unit being pipeline connected in sequence to the data load unit;
  a data store unit configured for performing a store operation with data from the data computation unit, and the data store unit being pipeline connected in sequence to the data computation unit, wherein at least a portion of the load operation and at least a portion of the store operation are performed concurrently with the data conversion within the programmable multi-stage pipelined Direct Memory Access controller;
  a double buffering connection between the data load unit and the data computation unit, and between the data computation unit and the data store unit, and configured for performing burst load and burst store operations on the data, wherein each double buffering connection comprises a dual port circular First In, First Out (FIFO) memory with a user-selectable fullness threshold to adjust an amount of the data buffered between multiple stages of the Direct Memory Access controller.

2. The programmable multi-stage pipelined Direct Memory Access controller according to claim 1, wherein the data computation unit is configured for conducting data conversion from a first predetermined format data to a second predetermined format data.

3. The programmable multi-stage pipelined Direct Memory Access controller according to claim 2, wherein the first predetermined data format is one of YUV (luma chrominance) and RGB (red, green, blue), and the second predetermined data format is the other of YUV and RGB.

4. The programmable multi-stage pipelined Direct Memory Access controller according to claim 2, wherein the first predetermined data format is one of encrypted data and decrypted data and the second predeteHnined data format is the other of encrypted data and decrypted data.

5. The programmable multi-stage pipelined Direct Memory Access controller according to claim 1, wherein the data load unit and data store unit are programmable.

6. The programmable multi-stage pipelined Direct Memory Access controller according to claim 4, wherein the data load unit and date store unit are further configured for defining how much data to transfer per operation.

7. The programmable multi-stage pipelined Direct Memory Access controller according to claim 1, wherein the data computation unit is programmable for running multiple software algorithms on data processed thereby.

8. The programmable multi-stage pipelined Direct Memory Access controller according to claim 1, wherein the data load unit and the data store unit each comprise a five stage pipeline.

9. A method for controlling access to memory in a data processing system, comprising:
providing a programmable multi-stage pipelined Direct Memory Access controller comprised of a data load unit configured for performing a load operation, a data computation unit configured for performing a data conversion and being pipeline connected in sequence to the data load unit, a data store unit configured for performing a store operation and being pipeline connected in sequence to the data computation unit, wherein at least a portion of the load operation and at least a portion of the store operation are perfoillted concurrently with the data conversion within the programmable multi-stage pipelined Direct Memory Access controller, and a double buffering connection between the data load unit and the data computation unit, and between the data computation unit and the data store unit, and configured for performing burst load and burst store operations on data, wherein each double buffering connection comprises a dual port circular First In, First Out (FIFO) memory with a user-selectable fullness threshold to adjust an amount of the data buffered between multiple stages of the Direct Memory Access controller;
loading data with the load unit and transferring the loaded data into first local memory of the programmable multi-stage pipelined Direct Memory Access controller;
fetching the loaded data from the first local memory with the data computation unit, operating on the loaded data by transforming the loaded data into a different format data, and transferring the different format data into second local memory of the programmable multi-stage pipelined Direct Memory Access controller; and
fetching the different format data from the second local memory with the store unit and transferring the different format data for storage in system memory.

10. The method according to claim 9, further comprising converting data from a first format to a second format by operating on data with the data computation unit.

11. The method according to claim 10, wherein the first format is one of YUV (luma chrominance) and RGB (red, green, blue), and the second format is the other of YUV and RGB.

12. The method according to claim 10, wherein the first format is one of encrypted and decrypted, and the second format is the other of encrypted and decrypted.

13. The method according to claim 9, wherein the data load unit and date store unit are programmed and operate by fetching data in predetermined amounts.

14. The method of claim 9, further comprising double buffering of data during transfers between units as the dual port circular First In, First Out (FIFO) memory operation with a user-selectable fullness threshold.

15. The method according to claim 9, wherein the computation unit is configured for running multiple software algorithms on data.

16. The method according to claim 9, wherein the data load unit and the data store unit each comprise a five stage pipeline.

17. The method according to claim 9, wherein the computation unit implements a system bus protocol for transferring data from the data load unit and to the data store unit.

18. The method according to claim 9, further comprising using the user-selectable fullness threshold to adjust the amount of the data buffered preceding a first stage of the multiple stages of the Direct Memory Access controller.

19. The method according to claim 9, further comprising using the user-selectable fullness threshold to adjust the amount of the data buffered following a first stage of the multiple stages of the Direct Memory Access controller.

20. The programmable multi-stage pipelined Direct Memory Access controller according to claim 1, wherein the user-selectable fullness threshold is used to adjust the amount of the data buffered preceding and following a first stage of the multiple stages of the Direct Memory Access controller.

* * * * *